(12) United States Patent
Derelöv

(10) Patent No.: US 11,272,783 B2
(45) Date of Patent: Mar. 15, 2022

(54) SET OF PANELS

(71) Applicant: Välinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 393 days.

(21) Appl. No.: 16/220,585

(22) Filed: Feb. 15, 2019

(65) Prior Publication Data

US 2019/0191870 A1 Jun. 27, 2019

(30) Foreign Application Priority Data

Dec. 22, 2017 (SE) .................................... 1751640-2

(51) Int. Cl.
| | |
|---|---|
| *A47B 47/00* | (2006.01) |
| *F16B 12/24* | (2006.01) |
| *F16B 12/26* | (2006.01) |
| *A47B 47/04* | (2006.01) |

(52) U.S. Cl.
CPC .......... *A47B 47/0075* (2013.01); *F16B 12/24* (2013.01); *F16B 12/26* (2013.01); *A47B 47/0066* (2013.01); *A47B 47/042* (2013.01)

(58) Field of Classification Search
CPC ............ A47B 47/0075; A47B 47/0066; A47B 47/042; F16B 12/24; F16B 12/26
See application file for complete search history.

(56) References Cited

U.S. PATENT DOCUMENTS

| | | |
|---|---|---|
| 291,032 A | 1/1884 | Cleland |
| 634,581 A | 10/1899 | Miller |
| 701,000 A | 5/1902 | Ahrens |
| 861,911 A | 7/1907 | Stewart |

(Continued)

FOREIGN PATENT DOCUMENTS

| | | |
|---|---|---|
| AT | 400 611 B | 2/1996 |
| CH | 365 507 A | 11/1962 |

(Continued)

OTHER PUBLICATIONS

U.S. Appl. No. 16/564,438, Hans Brännström, Agne Pålsson and Peter Derelöv, filed Sep. 9, 2019, (Cited herein as US Patent Application Publication No. 2020/0003242 A1 of Jan. 2, 2020).

(Continued)

*Primary Examiner* — Stanton L Krycinski
(74) *Attorney, Agent, or Firm* — Buchanan Ingersoll & Rooney P.C.

(57) ABSTRACT

A method, a locking device and a set of panels, including a panel and an adjacent panel, wherein the panel includes a groove and at least a first hole connected to the groove via an opening, the adjacent panel includes a first edge that is configured to be arranged in the groove of the panel and a second hole that is configured to be arranged at the opening when the first edge is arranged in the groove, and the panel includes a locking device configured to lock the first edge of the adjacent panel in the groove of the panel, wherein the locking device includes a locking pin and a flexible element, the flexible element is configured to move the locking pin from a locking position to a mounting position and to, when flexed back, move the locking pin from the mounting position to the locking position.

27 Claims, 8 Drawing Sheets

(56) References Cited

U.S. PATENT DOCUMENTS

| | | | |
|---|---|---|---|
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | Mackenroth |
| 4,116,510 A | 9/1978 | Franco |
| 4,142,271 A | 3/1979 | Busse |
| 4,208,850 A * | 6/1980 | Collier ............... F16B 12/24 297/440.1 |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,882,098 A | 3/1999 | Brown et al. |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 * | 11/2014 | Hakansson ........... F16B 5/0056 52/586.1 |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |

(56) References Cited

U.S. PATENT DOCUMENTS

| | | |
|---|---|---|
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0104483 A1 | 5/2005 | Saravis |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0164787 A1* | 7/2008 | Peng .................. F16B 12/26 312/108 |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |

(56) References Cited

U.S. PATENT DOCUMENTS

| | | |
|---|---|---|
| 2021/0276108 A1 | 9/2021 | Derelöv et al. |
| 2021/0285480 A1 | 9/2021 | Derelöv et al. |

FOREIGN PATENT DOCUMENTS

| | | | |
|---|---|---|---|
| CH | 685 276 A5 | 5/1995 | |
| CH | 696 889 A5 | 1/2008 | |
| CH | 698 988 B1 | 12/2009 | |
| CH | 705 082 A2 | 12/2012 | |
| CN | 101099618 A | 1/2008 | |
| CN | 102 917 616 A | 2/2013 | |
| CN | 203424576 U | 2/2014 | |
| DE | 734 489 C | 4/1943 | |
| DE | 1107910 B | 5/1961 | |
| DE | 2 254 289 A1 | 5/1974 | |
| DE | 2 300 675 A1 | 7/1974 | |
| DE | 2343710 A1 * | 3/1975 | ............ F16B 19/002 |
| DE | 24 14 104 A1 | 10/1975 | |
| DE | 25 14 357 A1 | 10/1975 | |
| DE | 31 03 281 A1 | 8/1982 | |
| DE | 228 872 A1 | 10/1985 | |
| DE | 42 29 115 A1 | 3/1993 | |
| DE | 94 17 168 U1 | 2/1995 | |
| DE | 198 31 936 A1 | 2/1999 | |
| DE | 298 20 031 U1 | 2/1999 | |
| DE | 198 05 538 A1 | 8/1999 | |
| DE | 203 04 761 U1 | 4/2004 | |
| DE | 299 24 630 U1 | 5/2004 | |
| DE | 20 2005 019 986 U1 | 2/2006 | |
| DE | 20 2004 017 486 U1 | 4/2006 | |
| DE | 20 2009 008 825 U1 | 10/2009 | |
| DE | 10 2008 035 293 A1 | 2/2010 | |
| DE | 10 2009 041 142 A1 | 3/2011 | |
| DE | 10 2011 057 018 A1 | 6/2013 | |
| DE | 10 2013 008 595 A1 | 11/2013 | |
| DE | 20 2014 100 090 U1 | 11/2014 | |
| DE | 10 2015 103 429 A1 | 10/2015 | |
| DE | 10 2014 110 124 A1 | 1/2016 | |
| DE | 20 2017 101 856 U1 | 4/2017 | |
| EP | 0 060 203 A2 | 9/1982 | |
| EP | 0 060 203 A3 | 9/1982 | |
| EP | 0 357 129 A1 | 3/1990 | |
| EP | 0 362 968 A | 4/1990 | |
| EP | 0 675 332 A2 | 10/1995 | |
| EP | 0 871 156 A2 | 10/1998 | |
| EP | 1 048 423 A2 | 11/2000 | |
| EP | 1 048 423 B9 | 5/2005 | |
| EP | 1 650 375 A1 | 4/2006 | |
| EP | 1 671 562 A1 | 6/2006 | |
| EP | 1 650 375 A8 | 9/2006 | |
| EP | 1 922 954 A1 | 5/2008 | |
| EP | 2 017 403 A2 | 1/2009 | |
| EP | 1 922 954 B1 | 7/2009 | |
| EP | 2 333 353 A2 | 6/2011 | |
| EP | 1 863 984 B1 | 11/2011 | |
| EP | 2 487 373 A1 | 8/2012 | |
| EP | 3 031 998 A1 | 6/2016 | |
| FR | 2 517 187 A1 | 6/1983 | |
| FR | 2 597 173 A1 | 10/1987 | |
| FR | 2 602 013 A1 | 1/1988 | |
| GB | 245332 | 1/1926 | |
| GB | 794608 A | 5/1958 | |
| GB | 799155 A | 8/1958 | |
| GB | 1 022 377 A | 3/1966 | |
| GB | 2 163 825 A | 3/1986 | |
| GB | 2 315 988 A | 2/1998 | |
| GB | 2 445 954 A | 7/2008 | |
| GB | 2 482 213 A | 1/2012 | |
| GB | 2 520 927 A | 6/2015 | |
| JP | S53-113160 U | 9/1978 | |
| JP | H06-22606 U | 3/1994 | |
| JP | 2003-239921 A | 8/2003 | |
| KR | 10-1147274 B1 | 5/2012 | |
| KR | 2014-0042314 A | 4/2014 | |
| WO | WO 87/07339 A1 | 12/1987 | |
| WO | WO 90/07066 | 6/1990 | |
| WO | WO 99/22150 A1 | 5/1999 | |
| WO | WO 99/41508 A2 | 8/1999 | |
| WO | WO 00/66856 A1 | 11/2000 | |
| WO | WO 01/53628 A1 | 7/2001 | |
| WO | WO 02/055809 A1 | 7/2002 | |
| WO | WO 02/055810 A1 | 7/2002 | |
| WO | WO 03/083234 A1 | 10/2003 | |
| WO | WO 2004/079130 A1 | 9/2004 | |
| WO | WO 2005/068747 A1 | 7/2005 | |
| WO | WO 2006/043893 A1 | 4/2006 | |
| WO | WO 2006/104436 A1 | 10/2006 | |
| WO | WO 2007/015669 A2 | 2/2007 | |
| WO | WO 2007/015669 A3 | 2/2007 | |
| WO | WO 2008/004960 A2 | 1/2008 | |
| WO | WO 2008/004960 A3 | 1/2008 | |
| WO | WO 2008/004960 A8 | 1/2008 | |
| WO | WO 2008/017281 A1 | 2/2008 | |
| WO | WO 2008/150234 A1 | 12/2008 | |
| WO | WO 2009/136195 A1 | 11/2009 | |
| WO | WO 2010/087752 A1 | 8/2010 | |
| WO | WO 2011/151758 A2 | 12/2011 | |
| WO | WO 2011/151758 A3 | 12/2011 | |
| WO | WO 2012/095454 A1 | 7/2012 | |
| WO | WO 2012/154113 A1 | 11/2012 | |
| WO | WO 2013/009257 A1 | 1/2013 | |
| WO | WO 2013/025163 A1 | 2/2013 | |
| WO | WO 2013/080160 A1 | 6/2013 | |
| WO | WO 2013/118075 A1 | 8/2013 | |
| WO | WO 2014/072080 A1 | 5/2014 | |
| WO | WO 2014/121410 A1 | 8/2014 | |
| WO | WO 2015/015603 A1 | 2/2015 | |
| WO | WO 2015/038059 A1 | 3/2015 | |
| WO | WO 2015/105449 A1 | 7/2015 | |
| WO | WO 2015/105450 A1 | 7/2015 | |
| WO | WO 2015/105451 A1 | 7/2015 | |
| WO | WO 2016/099396 A1 | 6/2016 | |
| WO | WO 2016/175701 A1 | 11/2016 | |
| WO | WO 2016/187533 A1 | 11/2016 | |
| WO | WO 2017/052456 A1 | 3/2017 | |
| WO | WO 2017/131574 A1 | 8/2017 | |
| WO | WO 2017/138874 A1 | 8/2017 | |
| WO | WO 2018/004435 A1 | 1/2018 | |
| WO | WO 2018/080387 A1 | 5/2018 | |
| WO | WO 2019/125291 A1 | 6/2019 | |
| WO | WO 2019/125292 A1 | 6/2019 | |

OTHER PUBLICATIONS

U.S. Appl. No. 16/553,325, Peter Derelöv and Johan Svensson, filed Aug. 28, 2019 (Cited herein as US Patent Application Publication No. 2020/0069048 A1 of Mar. 5, 2020).

U.S. Appl. No. 16/553,350, Peter Derelöv and Johan Svensson, filed Aug. 28, 2019, (Cited herein as US Patent Application Publication No. 2020/0069049 A1 of Mar. 5, 2020).

U.S. Appl. No. 16/663,603, Magnus Fridlund, filed Oct. 25, 2019, (Cited herein as US Patent Application Publication No. 2020/0055126 A1 of Feb. 20, 2020).

U.S. Appl. No. 16/703,077, Magnus Fridlund, filed Dec. 4, 2019, (Cited herein as US Patent Application Publication No. 2020/0102978 A1 of Apr. 2, 2020).

U.S. Appl. No. 16/567,436, Peter Derelöv and Mats Nilsson, filed Sep. 11, 2019.

U.S. Appl. No. 16/697,335, Christian Boo and Peter Derelöv, filed Nov. 27, 2019.

U.S. Appl. No. 16/722,096, Peter Derelöv and Christian Boo, dated Dec. 20, 2019.

U.S. Appl. No. 16/567,436, Derelöv.

U.S. Appl. No. 16/697,335, Boo et al.

U.S. Appl. No. 16/722,096, Derelöv et al.

Derelöv, Peter, U.S. Appl. No. 16/567,436 entitled "Panels Comprising a Mechanical Locking Device and an Assembled Product Comprising the Panels," filed in the U.S. Patent and Trademark Office on Sep. 11, 2019.

Boo, Christian, et al., U.S. Appl. No. 16/697,335 entitled "Panels Comprising a Mechanical Locking Device and an Assembled Prod-

(56) References Cited

OTHER PUBLICATIONS uct Comprising the Panels," filed in the U.S. Patent and Trademark Office on Nov. 27, 2019.
Derelöv, Peter, et al., U.S. Appl. No. 16/722,096 entitled "Panels Comprising a Mechanical Locking Device and an Assembled Product Comprising the Panels," filed in the U.S. Patent and Trademark Office on Dec. 20, 2019.
U.S. Appl. No. 17/119,392, Jimmie Bruno and Zoran Simunic, filed Dec. 11, 2020.
U.S. Appl. No. 17/126,518, Peter Derelöv, filed Dec. 18, 2020.
U.S. Appl. No. 17/119,392, Bruno et al.
U.S. Appl. No. 17/126,518, Derelöv et al.
Bruno, Jimmie, et al. U.S. Appl. No. 17/119,392 entitled "Mechanical Locking System for Panels," filed in the U.S. Patent and Trademark Office on Dec. 11, 2020.
Derelöv, Peter, U.S. Appl. No. 17/126,518 entitled "Set of Panels with a Mechanical Locking Device," filed in the U.S. Patent and Trademark Office on Dec. 18, 2020.
U.S. Appl. No. 16/951,394, Niclas Håkansson and Darko Pervan, filed Nov. 18, 2020.
U.S. Appl. No. 16/953,608, Peter Derelöv, Hans Brännström and Ange Pålsson, filed Nov. 20, 2020.
U.S. Appl. No. 16/951,394, Håkansson et al.
U.S. Appl. No. 16/953,608, Derelöv et al.
Håkansson, Niclas, et al., U.S. Appl. No. 16/951,394 entitled "Mechanical Locking System for Building Panels," filed in the U.S. Patent and Trademark Office on Nov. 18, 2020.
Derelöv, Peter, et al., U.S. Appl. No. 16/953,608 entitled "An Assembled Product and a Method of Assembling the Product," filed in the U.S. Patent and Trademark Office on Nov. 20, 2020.
U.S. Appl. No. 14/486,681, Hans Brännström, Agne Pålsson and Peter Derelöv, filed Sep. 15, 2014, (Cited herein as US Patent Application Publication No. 2015/0078807 A1 of Mar. 19, 2015).
U.S. Appl. No. 14/573,572, Christian Boo, filed Dec. 17, 2014, (Cited herein as US Patent Application Publication No. 2015/0198191 A1 of Jul. 16, 2015).
U.S. Appl. No. 15/271,622, Peter Derelöv and Mats Nilsson, filed Sep. 21, 2016, (Cited herein as US Patent Application Publication No. 2017/0079433 A1 of Mar. 23, 2017).
U.S. Appl. No. 15/308,872, Darko Pervan, filed Nov. 4, 2016, (Cited herein as US Patent Application Publication No. 2017/0089379 A1 of Mar. 30, 2017).
U.S. Appl. No. 15/415,356, Peter Derelöv and Christian Boo, filed Jan. 25, 2017, (Cited herein as US Patent Application Publication No. 2017/0208938 A1 of Jul. 27, 2017).
U.S. Appl. No. 15/422,798, Magnus Fridlund, filed Feb. 2, 2017, (Cited herein as US Patent Application Publication No. 2017/0227035 A1 of Aug. 10, 2017).
U.S. Appl. No. 15/428,469, Magnus Fridlund, filed Feb. 9, 2017, (Cited herein as US Patent Application Publication No. 2017/0227032 A1 of Aug. 10, 2017).
U.S. Appl. No. 15/428,504, Christian Boo, filed Feb. 9, 2017, (Cited herein as US Patent Application publication No. 2017/0227031 A1 of Aug. 10, 2017).
U.S. Appl. No. 15/432,190, Magnus Fridlund, filed Feb. 14, 2017, (Cited herein as US Patent Application Publication No. 2017/0234346 A1 of Aug. 17, 2017).
U.S. Appl. No. 15/642,757, Peter Derelöv, filed Jul. 6, 2017, (Cited herein as US Patent Application Publication No. 2017/0298973 A1 of Oct. 19, 2017).
U.S. Appl. No. 15/646,714, Peter Derelöv, filed Jul. 11, 2017, (Cited herein as US Patent Application Publication No. 2018/0087552 A1 of Mar. 29, 2018).
U.S. Appl. No. 15/562,254, Peter Derelöv, filed Sep. 27, 2017, (Cited herein as US Patent Application Publication No. 2018/0080488 A1 of Mar. 22, 2018).
U.S. Appl. No. 15/567,507, Christian Boo, Peter Derelöv and Agne Pålsson, filed Oct. 18, 2017, (Cited herein as US Patent Application Publication No. 2018/0112695 A1 of Apr. 26, 2018).
U.S. Appl. No. 15/794,491, Peter Derelöv, filed Oct. 26, 2017, (Cited herein as US Patent Application Publication No. 2018/0119717 A1 of May 3, 2018).
U.S. Appl. No. 15/923,701, Peter Derelöv, filed Mar. 16, 2018, (Cited herein as US Patent Application Publication No. 2018/0202160 A1 of Jul. 19, 2018).
U.S. Appl. No. 15/978,630, Jonas Fransson, Niclas Håkansson and and Agne Pålsson, filed May 14, 2018, (Cited herein as US Patent Application Publication No. 2018/0328396 A1 of Nov. 15, 2018).
U.S. Appl. No. 16/027,479, Christian Boo and Peter Derelöv, filed Jul. 5, 2018, (Cited herein as US Patent Application Publication No. 2019/0166989 A1 of Jun. 6, 2019).
U.S. Appl. No. 16/220,574, Peter Derelöv, filed Dec. 14, 2018, (Cited herein as US Patent Application Publication No. 2019/0195256 A1 of Jun. 27, 2019).
U.S. Appl. No. 16/228,975, Niclas Håkansson and Darko Pervan, filed Dec. 21, 2018, (Cited herein as US Patent Application Publication No. 2019/0113061 A1 of Apr. 18, 2019).
U.S. Appl. No. 15/956,949, Peter Derelöv, filed Apr. 19, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 15/956,949, Derelöv.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
International Search Report/Written Opinion dated Mar. 18, 2019 in PCT/SE2018/051320, ISA/SE, Patent-och registreringsverket, Stockholm, SE, 9 pages.
Derelöv, Peter, U.S. Appl. No. 15/956,949 entitled "Panels for an Assembled Product", filed in the U.S. Patent and Trademark Office on Apr. 19, 2018.
Derelöv, Peter, et al., U.S. Appl. No. 16/361,609 entitled "Panels Comprising a Mechanical Locking Device and an Assembled Product Comprising the Panels," filed in the U.S. Patent and Trademark Office on Mar. 22, 2019.
Boo, Christian, U.S. Appl. No. 16/386,732 entitled "Set of Panels With a Mechanical Locking Device," filed in the U.S. Patent and Trademark Office on Apr. 17, 2019.
Boo, Christian, U.S. Appl. No. 16/386,810 entitled "Set of Panels With a Mechanical Locking Device," filed in the U.S. Patent and Trademark Office on Apr. 17, 2019.
Boo, Christian, U.S. Appl. No. 16/386,824 entitled "Set of Panels With a Mechanical Locking Device," filed in the U.S. Patent and Trademark Office on Apr. 17, 2019.
Derelöv, Peter, U.S. Appl. No. 16/386,874 entitled "Symmetric Tongue and T-Cross," filed in the U.S. Patent and Trademark Office on Apr. 17, 2019.
U.S. Appl. No. 16/861,639, Peter Derelöv, filed Apr. 29, 2020.
U.S. Appl. No. 16/946,047, Darko Pervan, filed Jun. 4, 2020.
U.S. Appl. No. 16/915,258, Hans Brännström, Agne Pålsson and Peter Derelöv, filed Jun. 29, 2020.
U.S. Appl. No. 16/861,639, Derelöv.
U.S. Appl. No. 16/946,047, Pervan.
U.S. Appl. No. 16/915,258, Brännström et al.
Derelöv, Peter, U.S. Appl. No. 16/861,639 entitled "Panels Comprising a Mechanical Locking Device and an Assembled Product Comprising the Panels," filed in the U.S. Patent and Trademark Office on Apr. 29, 2020.
Pervan, Darko, U.S. Appl. No. 16/946,047 entitled "Mechanical Locking System for Building Panels," filed in the U.S. Patent and Trademark Office on Jun. 4, 2020.
Brännström, Hans, et al., U.S. Appl. No. 16/915,258 entitled "Assembled Product and Method of Assembling the Assembled Product," filed in the U.S. Patent and Trademark Office on Jun. 29, 2020.
U.S. Appl. No. 17/398,416, Thomas Meijer, filed Aug. 10, 2021.

(56) References Cited

OTHER PUBLICATIONS

Meijer, Thomas, U.S. Appl. No. 17/398,416 entitled "Panels with Edge Reinforcement," filed in the U.S. Patent and Trademark Office Aug. 10, 2021.
U.S. Appl. No. 17/514,055, Marko Sostar, filed Oct. 29, 2021.
Extended European Search Report dated Aug. 31, 2021 in European Patent No. 18890665.5, European Patent Office, Munich, DE, 5 pages.
Sostar, Marko, U.S. Appl. No. 17/514,055 entitled "Set of Panels, A Method for Assembly of the Same, and a Locking Device for a Furniture Product," filed in the U.S. Patent and Trademark Office Oct. 29, 2021.
U.S Appl. No. 17/524,293, Hans Brännström, Agne Pålsson, Peter Derelöv, filed Nov. 11, 2021.
Brännström, Hans, et al., U.S. Appl. No. 17/524,293 entitled "Assembled Product and a Method of Assembling the Assembled Product," filed in the U.S. Patent and Trademark Office Nov. 11, 2021.

\* cited by examiner

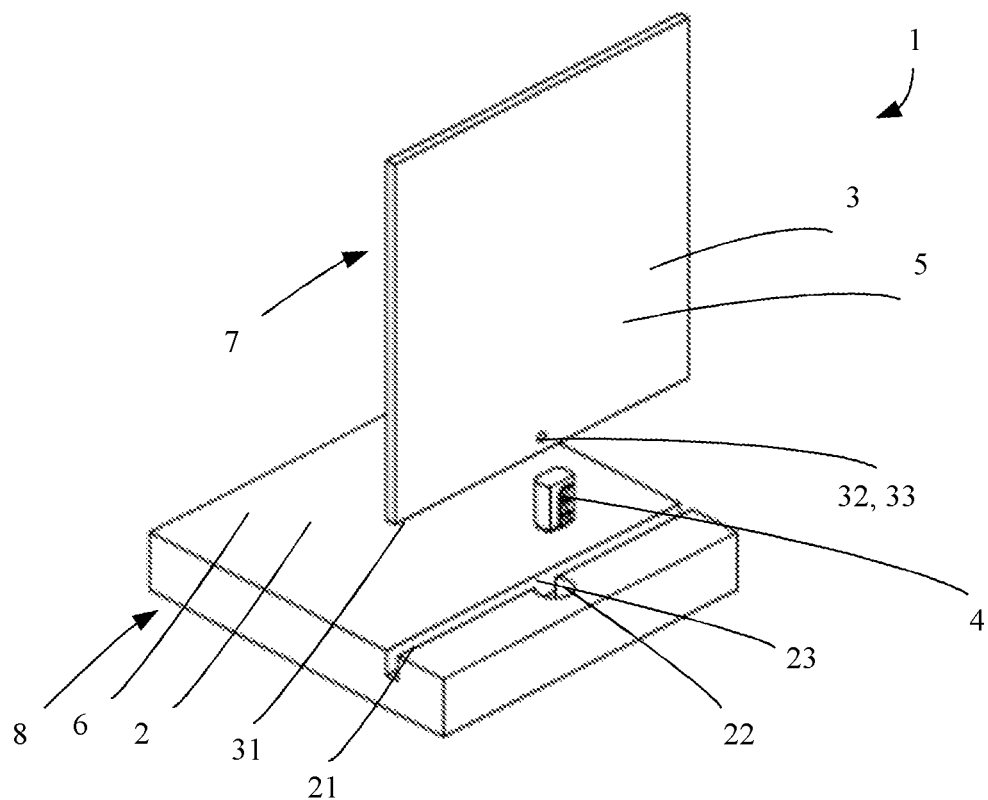
FIG. 1
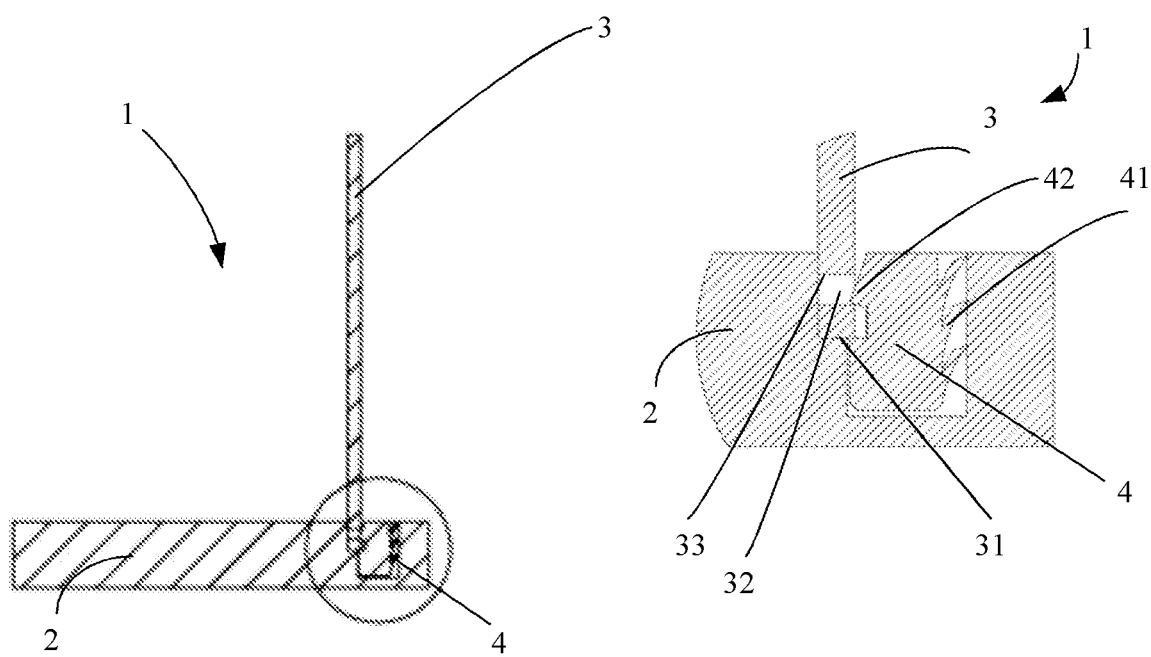
FIG. 2A
FIG. 2B

SET OF PANELS

CROSS REFERENCE TO RELATED APPLICATIONS

The present application claims the benefit of Swedish Application No. 1751640-2, filed on Dec. 22, 2017. The entire contents of Swedish Application No. 1751640-2 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component.

BACKGROUND ART

A furniture product provided with a mechanical locking device is known in the art, as disclosed in WO 2014/072080. The furniture product comprises a first panel connected perpendicular to a second panel by a mechanical locking device comprising a flexible tongue in an insertion groove and a pin that is inserted into the mechanical locking device to move the flexible tongue.

Embodiments of the present invention address a need to provide an easier assembling and/or an increased locking strength of the panels.

SUMMARY

It is an object of at least certain embodiments and aspects of the present invention to provide an improvement over the above described techniques and known art.

A further object of at least certain aspects of the present invention is to facilitate assembling of panels configured to be assembled without the need of using any tools.

A further object of at least certain aspects of the present invention is to facilitate disassembling of panels configured to be assembled and disassembling without the need of tools.

A further object of at least certain aspects of the present invention is to facilitate assembling of panels configured to be assembled with a locking device that is easy to manufacture and to use.

A further object of at least certain aspects of the present invention is to facilitate assembling of panels configured to be assembled with a locking device that is in one piece.

At least some of these and other objects and advantages that may be apparent from the description have been achieved by a set of panels, preferably for a furniture product. The set of panels comprises a panel and an adjacent panel. The panel comprises a groove and at least a first hole connected to the groove via an opening. The adjacent panel comprises a first edge that is configured to be arranged in the groove of the panel and a second hole that is configured to be arranged at the opening when the first edge is arranged in the groove. The panel comprises a locking device configured to lock the first edge of the adjacent panel in the groove of the panel. The locking device is configured to be arranged in the first hole of the panel. The locking device comprises a locking pin and a flexible element. The flexible element is configured to, when flexed in a first direction, move the locking pin from a locking position to a mounting position and to, when flexed back, move the locking pin from the mounting position to the locking position. At least a part of the locking pin is configured to, in the locking position, extend into the groove through the opening of the panel and to be at least partly arranged in the second hole of the adjacent panel when it is arranged in the groove. The locking pin is configured to, when moved to the mounting position, be moved in the first direction away from the groove, such that the first edge of the adjacent panel is free to be arranged in the groove of the panel. By a set of panels in accordance to this the adjacent panel and the panel could be locked to each other in an effective way and in an easy way. The locking device exerts a force to the adjacent panel that locks the adjacent panel and the panel together in a good way. The locking device does not need any tools to be used. Further, the locking device is a single piece that is easy to use. Further, by only having a single piece locking device the manufacturing of the locking device could be made in one step and thus reduce the cost for the locking device. The set of panels also involves the advantage of that the adjacent panel does not need to be machined in a complicated manner, since a hole could be accomplished in an easy and cost efficient manner.

According to an aspect, the locking device comprises a cylinder comprising a top and bottom base and a surface connecting the top and bottom base and wherein the flexible element and the locking pin is connected to the cylinder.

According to an aspect, the flexible element is a flexible lever that in a first end is connected to the cylinder and in a second end is connected to the locking pin.

According to an aspect, the flexible element is an extension of the surface of the cylinder.

According to an aspect, the locking device comprises one or more locking projections configured to lock the locking device against a wall of the first hole of the panel in at least a direction that is parallel with a depth of the first hole.

According to an aspect, the one or more of the flexible elements is configured to lock the locking device against the wall of the first hole of the panel in at least a direction that is parallel with the depth of the first hole.

According to an aspect, the one or more of the flexible element comprises the locking projection.

According to an aspect, the locking pin, when the locking device is arranged in the first hole, extend in at least a direction towards the opening and the groove.

According to an aspect, the flexible element, when the locking device is arranged in the first hole, extends in at least a direction that is parallel the opening and the groove.

According to an aspect, the flexible element, when the locking device is arranged in the first hole, extends in at least a direction away from the opening and the groove.

According to an aspect, the locking pin comprises a first inclined surface that is configured to interact with a wall of the second hole of the adjacent panel to lock the adjacent panel in the groove.

According to an aspect, the first inclined surface of the locking pin is configured to interact with the wall of the second hole to press the first edge of the adjacent panel downward in the groove.

According to an aspect, the locking pin is configured to interact with the first edge of the adjacent panel, when the locking device is arranged in the first hole and the adjacent panel is moved downwards into the groove, such that the locking pin is moved from the locking position towards the mounting position.

According to an aspect, the locking pin comprises a second inclined surface configured to interact with the first edge of the adjacent panel.

According to an aspect, the locking device comprises an unlocking tab configured to be moved in the first direction away from the groove to move the locking pin from the locking position to the mounting position.

According to an aspect, the unlocking tab is connected to the locking pin.

According to an aspect, the unlocking tab extends outside the first hole when the locking device is arranged in the first hole.

According to an aspect, the locking device comprises a heel configured to, when the adjacent panel is arranged in the groove, interact with the first edge of the adjacent panel and to limit a maximum distance between the first edge of the adjacent panel and the locking pin.

According to an aspect, the first hole is a circular hole, a circular segment of the first hole extends into the groove with a height of the circular segment and a chord of the circular segment defines a width of the opening.

According to an aspect, the second hole is a circular hole, a groove that is parallel to the edge or a recess.

According to an aspect, a largest diameter of the cylinder is substantially equal to the diameter of the first hole.

According to an aspect, the part of the locking pin extends, in the locking position, through the opening into the groove with a length that is 5-25% of the largest diameter of the cylinder, preferably the length is 10-15% of the largest diameter of the cylinder.

According to an aspect, the panel and the adjacent panel is one of a bottom piece of a drawer, a frame and a back piece of a furniture product.

At least some of the above identified and other objects and advantages that may be apparent from the description have been achieved by a locking device for a furniture product in accordance with the above.

At least some of the above and other objects and advantages that may be apparent from the description have been achieved by a method for assembly of a set of panels in accordance to the above. The method comprising the step of inserting the locking device into the first hole of the panel, moving the locking pin from the locking position to the mounting position, inserting the first edge of the adjacent panel into the groove of the panel, and moving the locking pin from the mounting position to the locking position, such that at least a part of the locking pin is arranged in the second hole of the adjacent panel.

According to an aspect, the method comprises the further steps of moving the locking pin from the locking position to the mounting position to unlock the first edge of the adjacent panel in the groove, and removing the first edge of the adjacent panel from the groove of the panel.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which FIG. 1 is a perspective view of a set of panels according to an aspect of the invention in an unassembled state.

FIGS. 2A and 2B are a cross sectional view of a set of panels in an assembled state and an enlargement of the locking device in the locking position.

DETAILED DESCRIPTION

Figure 3:
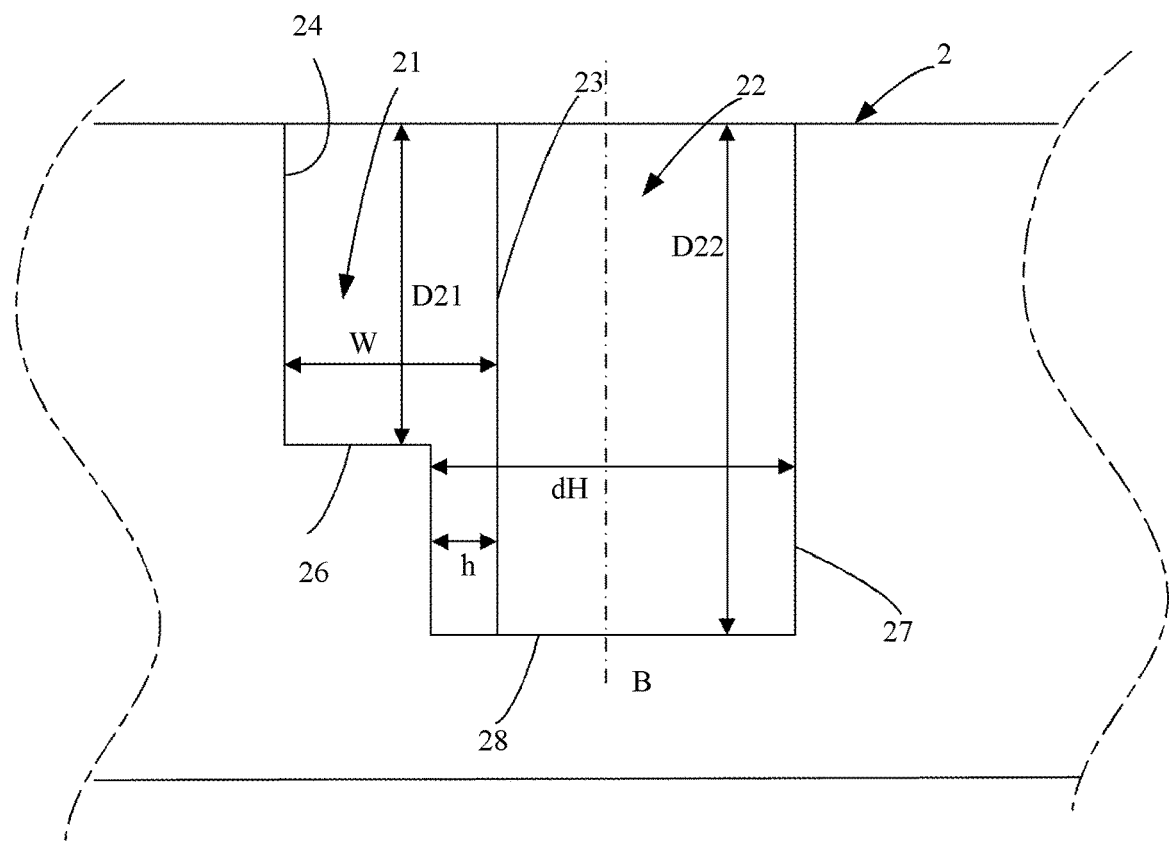
FIG. 3 is a cross sectional view of a part of a panel disclosing a groove and a hole.

Aspects of the present disclosure will be described more fully hereinafter with reference to the accompanying drawings. The set of panels and their parts disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

When the word "about" is used in this specification in connection with a numerical value, it is intended that the associated numerical value include a tolerance of +/−10% around the stated numerical value.

The different aspects of the invention disclosed herein can be combined with the other aspects described herein. Two or more aspects can be combined.

An embodiment of the present invention as shown in FIG. 1, to which now is referred to, disclose a set of panels 1. The set of panels 1 are preferably for a furniture product. The set of panels 1 comprises a panel 2 and an adjacent panel 3. The panel 2 and the adjacent panel 3 are arranged to be connected to each other and be perpendicular to each other. The panel 2 and the adjacent panel 3 each preferably comprises four edges, an outer surface 5,6 and an inner surface 7,8. The outer and/or the inner surfaces may comprise a decorative layer (not shown).

Figure 4:
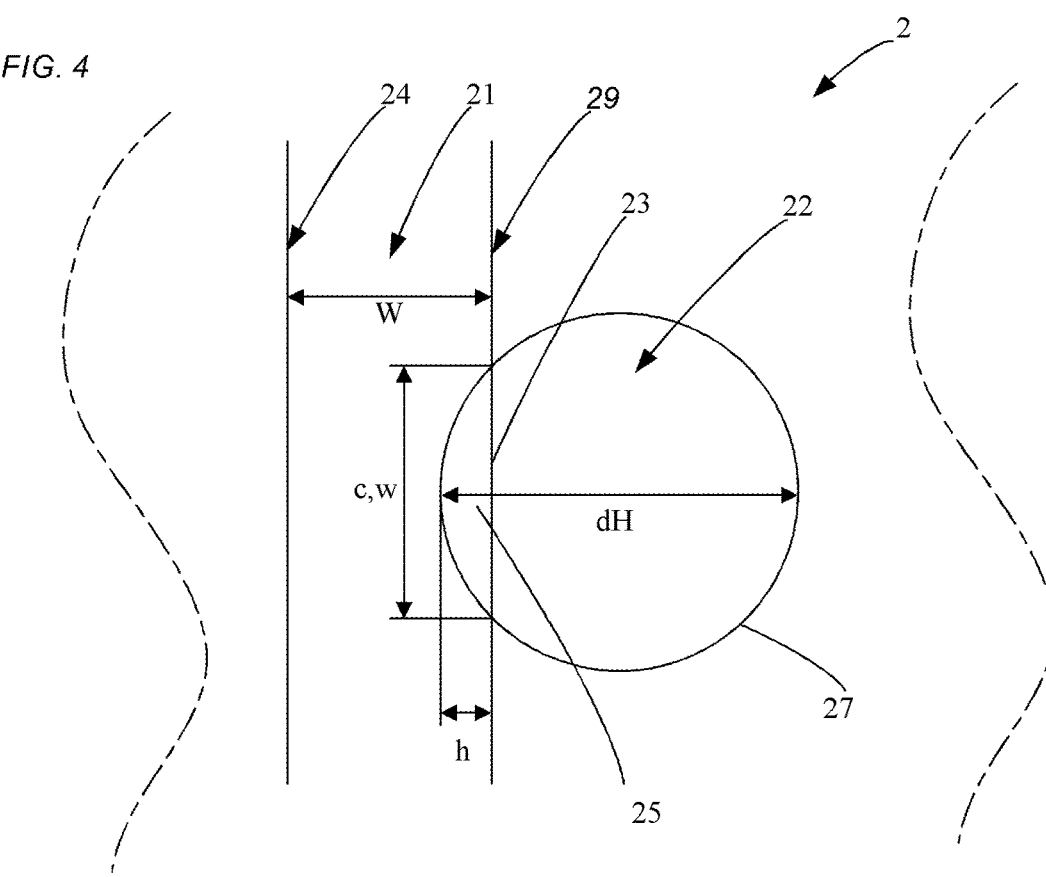
FIG. 4 is a view from above of a part of a panel disclosing the groove and the hole.
Figure 5:
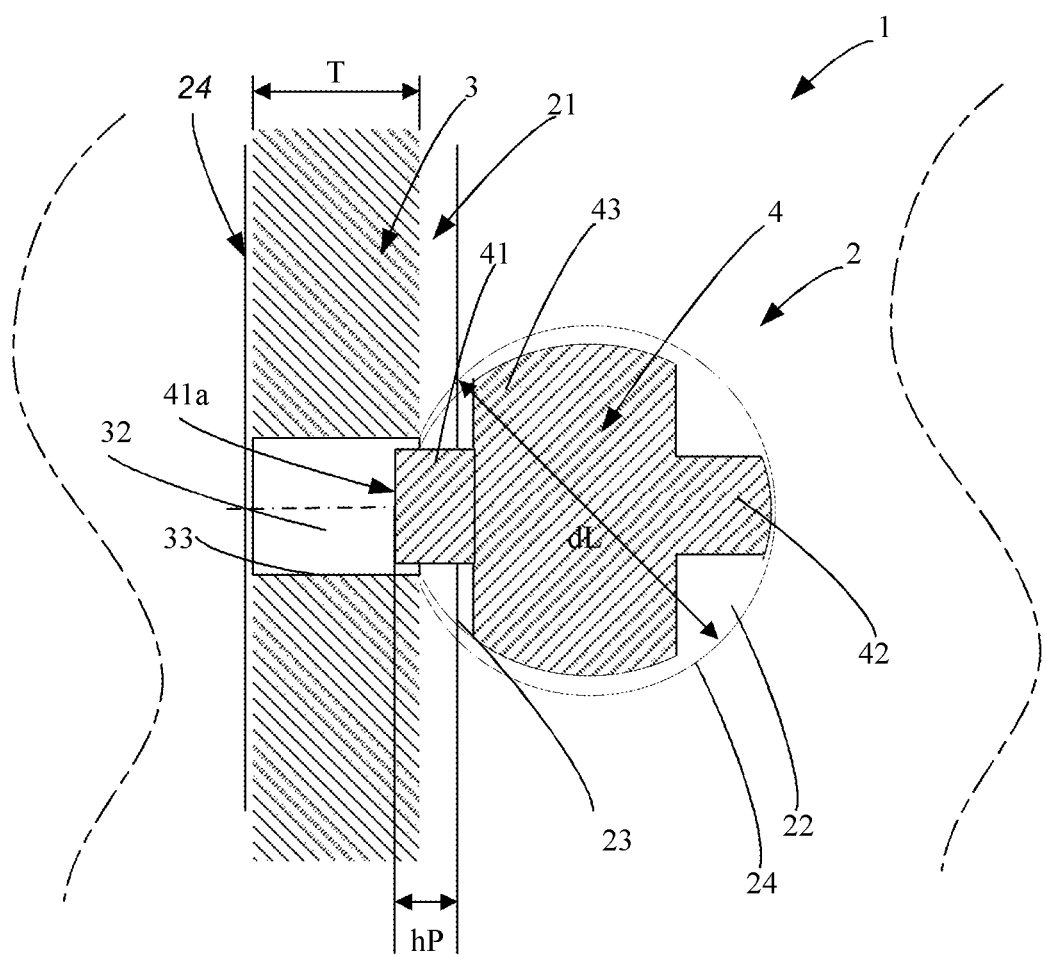
FIG. 5 is a cross sectional view of a part of an assembled set of panels disclosing the adjacent panel in the groove and the locking device in the hole.
Figure 6A:
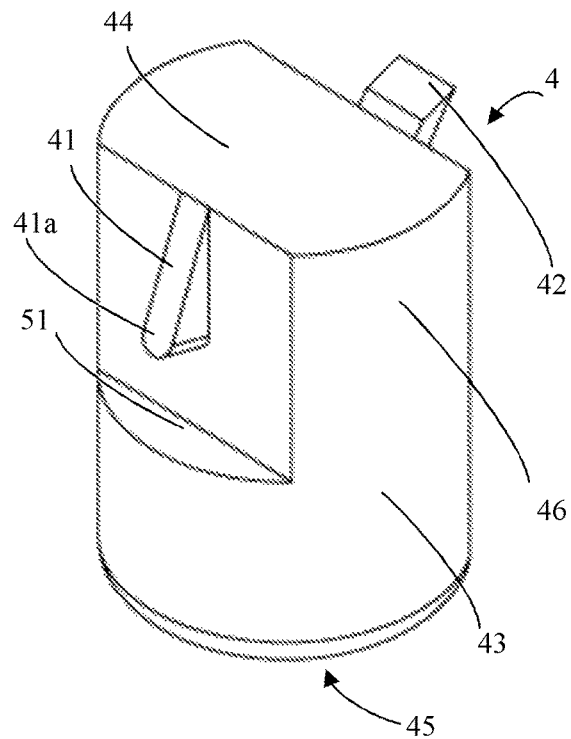
FIGS. 6A-6D disclose a locking device according to an aspect from four different angles.
Figure 6B:
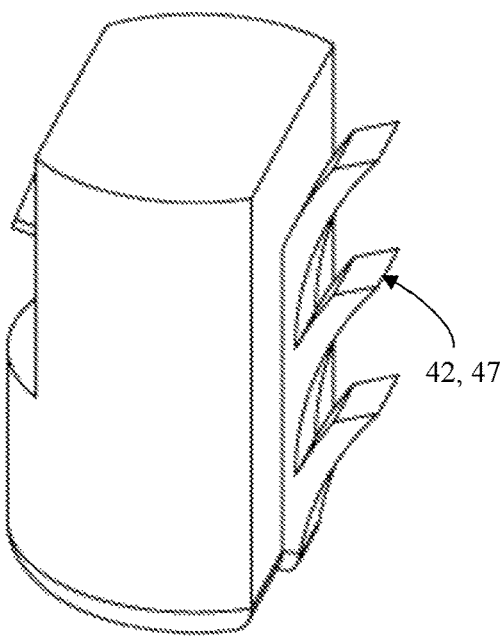
Figure 6C:
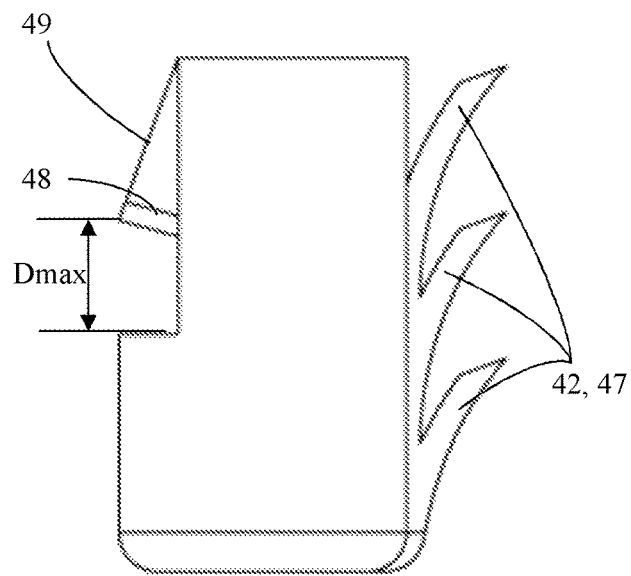
Figure 6D:
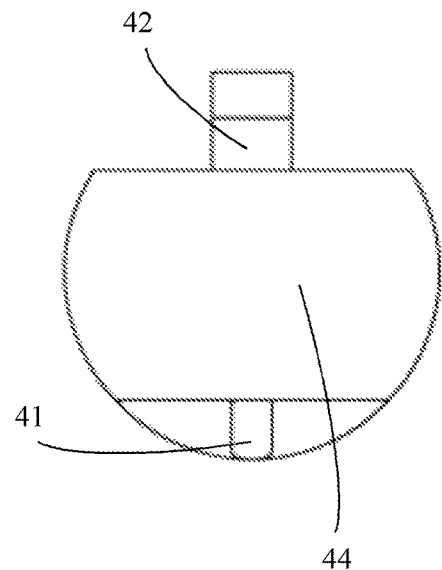
Figure 7A:
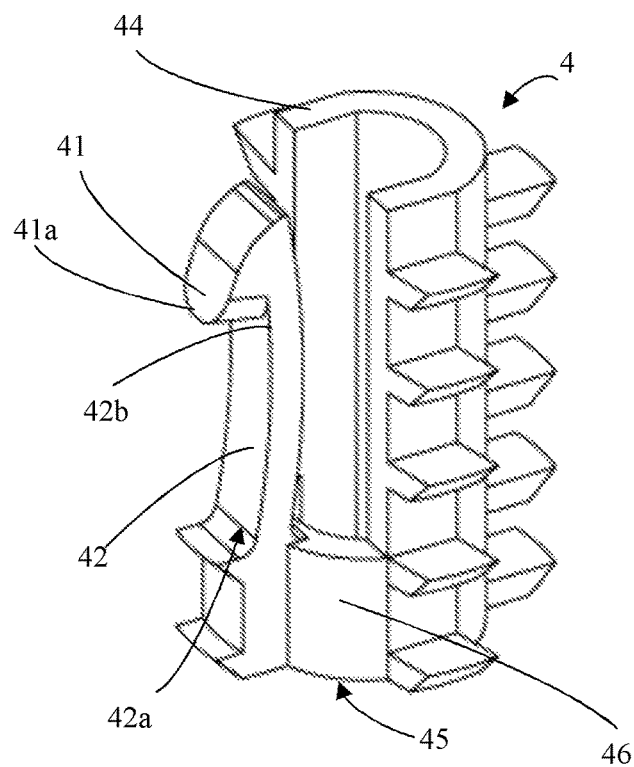
FIGS. 7A-7D disclose a locking device according to an aspect from four different angles.
Figure 7B:
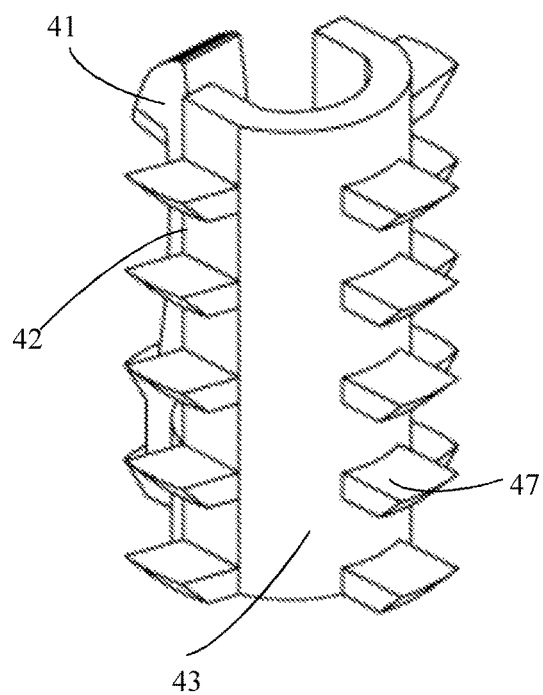
Figure 7C:
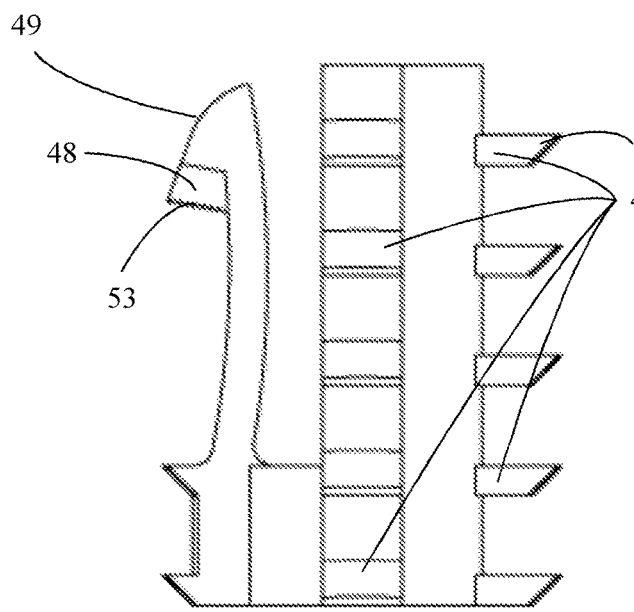
Figure 7D:
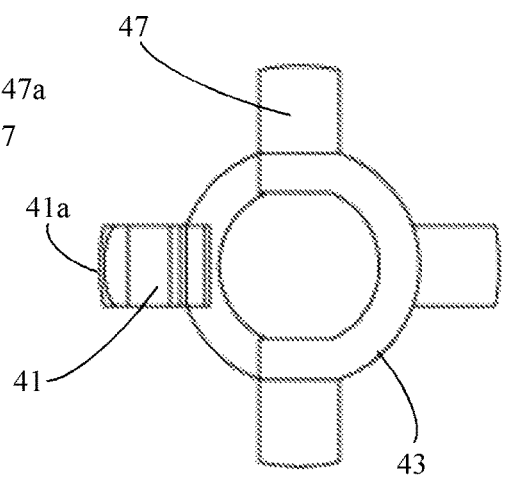
Figure 8A:
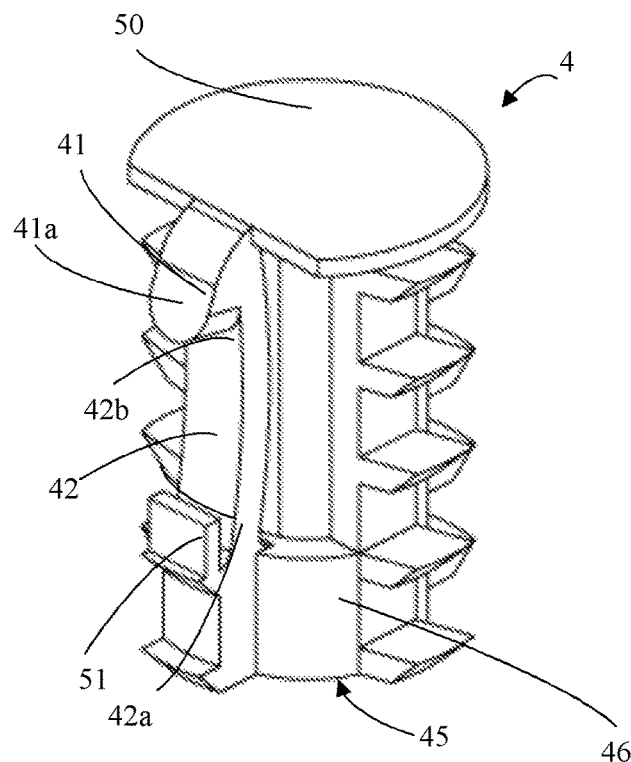
FIGS. 8A-8D disclose a locking device according to an aspect from four different angles.
Figure 8B:
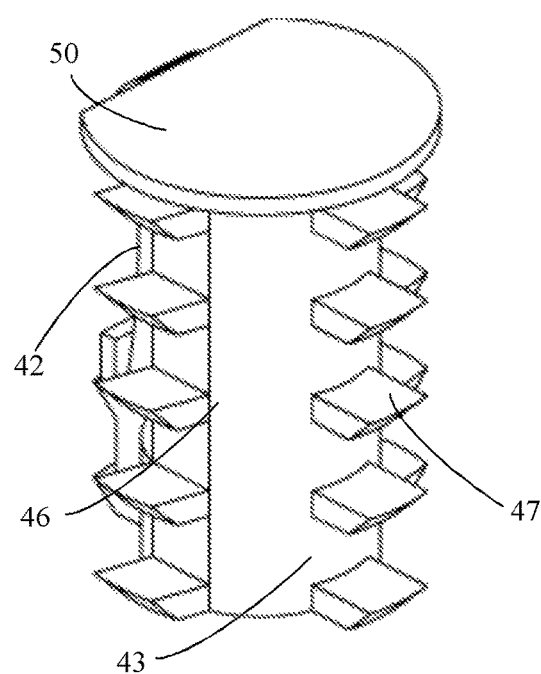
Figure 8C:
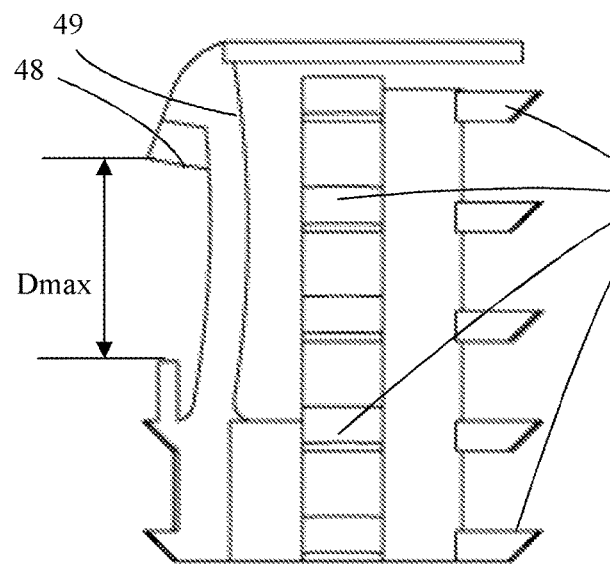
Figure 8D:
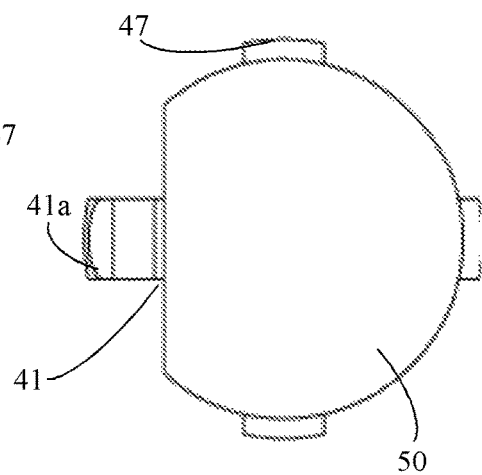

An embodiment of the panel 2 is disclosed in FIGS. 3, 4 and 5. The panel 2 comprises a groove 21 and at least one hole 22. The hole 22 is connected to the groove 21 via an opening 23. The groove 21 has a depth D21 and a width W. The groove 21 runs, according to an aspect, parallel to an edge of the panel 2. The length of the groove 21 is, according to an aspect, equal to or larger than the length of a first edge 31 of the adjacent panel 3 that should be arranged in the groove 21. The circumference of the hole 22, according to an aspect, overlap the extension of the groove 21. A plane that defines the connection between the hole 22 and the groove 21 is defined as the opening 23. The hole 22 has a depth D22. According to an aspect, the hole 22 is a through going hole (not shown). Depth D22 may be the same or substantially the same as depth D21; alternatively, depth D22 may be greater than depth D21.

According to an aspect, the hole 22 is a circular hole 22, as disclosed in FIGS. 3 and 4. A circular segment 25 of the hole 23 overlaps with the groove 21. Put another way, the circular segment 25 extends into the groove 21. The hole 22 extends into the groove 21 with the height h of the circular segment 25. A chord c of the circular segment 25 that extends into the groove 21 is another way to describe the opening 23. The length of the chord c of the circular segment 25 defines a width w of the opening 23. The hole 22 has a diameter dH.

The groove 21 has walls 24,29 and a bottom 26. The hole 22 has wall 27 and a bottom 28. The hole 22 defines an axis B.

The adjacent panel 3 comprises a first edge 31, as disclosed in FIGS. 1, 2A, and 2B. The first edge 31 of the adjacent panel 3 is configured to be arranged in the groove 21 of the panel 2. The thickness T of the adjacent panel 3, at least at the first edge 31, is equal to or smaller than the width W of the groove 21 of the panel 2. The adjacent panel 3 comprises a second hole 32. The position of the second hole 32 is such that it is configured to be arranged at the opening 23 of the panel 2. According to an aspect, the second hole 32 is configured to interact with a locking device 4 to lock the adjacent panel 3 to the panel 2. The second hole 32 has a wall 33. According to an aspect, the second hole 32 is a through going hole 32. According to an aspect, the second hole 32 has a bottom (not shown). According to an aspect, the second hole 32 is a groove that runs parallel with the first edge 31 of the adjacent panel (not shown).

The panel 2 comprises the locking device 4. The locking device 4 is configured to lock the first edge 31 of the adjacent panel 3 in the groove 21 of the panel 2. Put another way, the locking device 4 is adapted to lock the adjacent panel 3 to the panel 2. By lock is meant that that the first edge 31 of the adjacent panel 3 is restricted from moving out of the groove 21 of the panel 2. Put another way, the locking device 4 increases the force in at least one direction that has to be exerted to the adjacent panel 3 in comparison to the force that has to be exerted to the adjacent panel 3 to remove it from the groove 21 without the locking device 4. For example, the increased force may be at least twice as great, or at least five times as great.

The locking device 4 is disclosed in more detail in FIGS. 5 and 6A-8D. The locking device 4 is configured to lock the first edge 31 of the adjacent panel 3 in the groove 21 of the panel 2.

The locking device 4 is configured to be arranged in the first hole 22 of the panel 2. The locking device 4 comprises a locking pin 41 and a flexible element 42. The flexible element 42 is configured to, when flexed in a first direction A, as disclosed in FIG. 9B, move the locking pin 41 from a locking position to a mounting position. The flexible element 42 is configured to, when flexed back, move the locking pin 41 from the mounting position to the locking position. At least a part 41a of the locking pin 41 is configured to, in the locking position, extend into the groove 21 through the opening 23 of the panel 2 and to be at least partly arranged in the second hole 32 of the adjacent panel 3 when it is arranged in the groove 21.

The locking pin 41 is configured to, when moved to the mounting position, be moved in the first direction A away from the groove 21, such that the first edge 31 of the adjacent panel 3 is free to be arranged in the groove 21 of the panel 2.

According to an aspect, the locking pin 4 comprises a first inclined surface 48. The first inclined surface 48 is configured to interact with the wall 33 of the second hole 32 of the adjacent panel 3 to lock the adjacent panel 3 in the groove 21. The first inclined surface 48 is inclined downwards, such that the base of the first inclined surface 48 is lower than the tip of the first inclined surface 48. When the locking pin 41 is inserted into the second hole 32 the inclined surface 48 will make contact with the wall 33 of the second hole 32 and the force exerted from the flexible element 42 in combination with the inclination will interact and press the adjacent panel 3 downwards in the groove 21. According to an aspect, the first inclined surface 48 comprises ridges 53, as disclosed in FIG. 7C, to increase the friction between the first inclined surface 48 and the wall 33. The ridges 53 create a ribbed pattern on the first inclined surface 48.

Figure 9A:
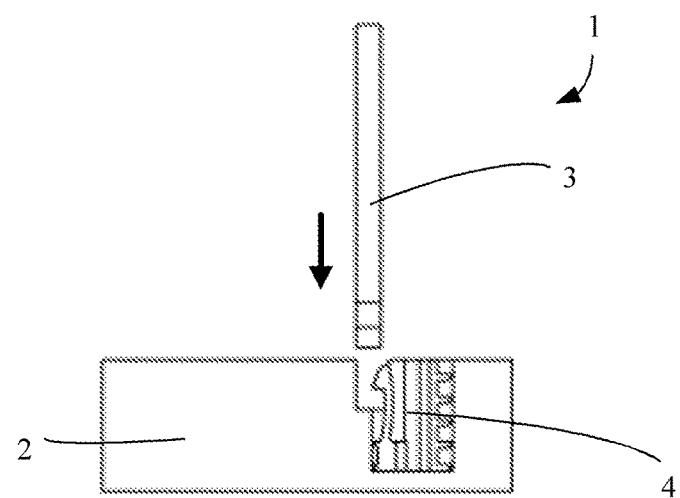
FIGS. 9A-9C disclose a cross sectional view of a set of panels according to an aspect in the mounting position, an intermediate position between the mounting and locking position and in the locking position.
Figure 9B:
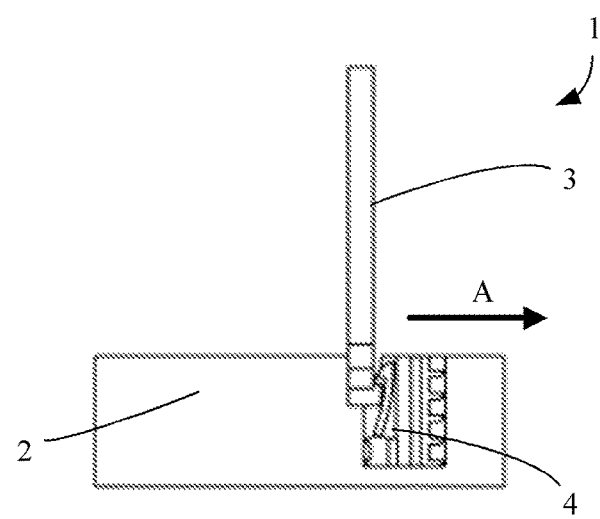

According to an aspect, the locking pin 41 is configured to interact with the first edge 31 of the adjacent panel 3, when the locking device 4 is arranged in the first hole 31 and the adjacent panel 3 is moved downwards into the groove 21, such that the locking pin 41 is moved from the locking position towards the mounting position as is disclosed in FIG. 9B. When the adjacent panel 3 is inserted into the groove 21 the first edge 31 of the adjacent panel will make contact with the locking pin 41 in the locking position as is disclosed in FIG. 9A. As the adjacent panel 3 is moved further downwards into the groove 21 the first edge 31 will exert a force onto the locking pin 41. The locking pin 41 that is connected to the flexible element 42 will transfer the force to the flexible element 42 and the flexible element 42 will flex in the direction A away from the groove 21. The locking pin 41 connected to the flexible element 42 will move together with the flexible element 4 in the direction A away from the groove 21 from the locking position towards the mounting position. When the locking pin 41 is moved to the locking position the adjacent panel 3 could have moved further downwards in the groove 21. When the adjacent panel 3 is moved further downwards into the groove 21 the second hole 32 of the adjacent panel 3 will be arranged at the locking pin 41. The flexible element 42 exert a force opposite direction A towards the groove 21 on the locking pin 41 as it strives to flex back to its initial position. When the second hole 32 is at the locking pin 41 the flexible element 42 will press the locking pin 41 towards the second hole 32 and at least a part 41a of the locking pin 41 will enter into the second hole 32 and lock the adjacent panel 3 to the panel 2.

According to an aspect, the locking pin 4 comprises a second inclined surface 49 configured to interact with the first edge 31 of the adjacent panel 3, as disclosed in FIGS. 6A-8D. The second inclined surface 49 will reduce the force needed from the adjacent panel 3 to move the locking pin 41 from the locking position towards the mounting position.

According to an aspect, the locking device comprises a body 43. According to an aspect, the body 43 is a cylinder 43. The cylinder 43 comprises a top base 44, a bottom base 45 and a surface 46. The surface 46 is connecting the top and bottom base 44, 45. The flexible element 42 and the locking pin 41 are connected to the cylinder 43.

According to an aspect, the flexible element 42 is a flexible lever 42 that in a first end 42a is connected to the cylinder 43 and in a second end 42b is connected to the locking pin 41, as disclosed in FIGS. 7 and 8. According to an aspect, the flexible element 42 is an extension of the surface 46 of the cylinder 43, as disclosed in FIGS. 7A and 8A. Put another way, the flexible element 42 may extend from the bottom base 45 of the cylinder 43 towards the top base 44.

According to an aspect, the flexible element 42, extends in at least a direction that is parallel the opening 23 and the groove 21 when the locking device 4 is arranged in the first hole 22, as disclosed in FIGS. 6A-6D.

According to an aspect, the flexible element 42 extend in at least a direction away from the opening 23 and the groove 21 when the locking device 4 is arranged in the first hole 22, as disclosed in FIGS. 6A-6D. According to an aspect, the flexible element 42 extend in at least the direction A from the opening 23 and the groove 21 when the locking device 4 is arranged in the first hole 22. According to an aspect, the flexible element 42 extends in an inclined direction from the cylinder 43. According to an aspect, the flexible element 42 extends in an oblique direction from the cylinder 43.

According to an aspect, the locking device 4 comprises one or more locking projections 47 configured to lock the locking device 4 against the wall 27 of the first hole 22 of the panel 2 in at least a direction that is parallel with a depth D22 of the first hole 22. According to an aspect, the locking projections 47 extend in the radial direction from the surface 46 of the cylinder 43. According to an aspect, the locking projections 47 each have an inclined surface 47a as disclosed in FIG. 7C. The inclined surface 47a is inclined downwards towards the bottom base 45. When the locking device 4 is arranged in the first hole 22 the locking projections 47 will interact with the wall 27 of the first hole 22 and act as barbs and restrict an upward movement of the locking device 4 in the first hole 22.

According to an aspect, the locking projections 47 extend further in the radial direction of the cylinder 43 than the largest diameter dL of the first hole 22. When the locking device 4 is arranged in the first hole 22, the locking projections 47 make contact with the walls 24 of the first hole 22 and bend upwards. If a upward force is exerted on the locking device 4 the locking projections 47 will act as barbs and lock the locking device 4 with a high force in the first hole 22. According to an aspect, the locking projections 47 are adapted to cut into the wall 27 of the first hole 22 when the locking device is moved from the mounting position towards the locking position. The locking projections 47 will exert a force against the wall 27 of the hole 22. If the force exceeds a value, depending on the material of the locking device 4 and the wall 27, the locking projections 47 of the locking device 4 will cut into the wall 27.

According to an aspect, the one or more of the flexible elements 42 is configured to lock the locking device 4 against the wall 27 of the first hole 22 of the panel 2 in at least a direction that is parallel with the depth D22 of the first hole 22.

According to an aspect, the locking projections 47 are positioned at different positions over the surface 46. The number of locking projections 47 needed depends on the force that the locking device 4 should be able to resist without being moved upwards or disassembled from the first hole 22. According to an aspect, the locking device 4 comprises fifteen locking projections 47 arranged in three different directions on the surface 46, as disclosed in FIGS. 7A-7D and 8A-D.

According to an aspect, the one or more of the flexible element 42 comprises the locking projection 47, as disclosed in FIGS. 6A-D. The flexible element 42 is configured to function as both a flexible element 42, moving the locking pin 41 between the mounting and locking position, and as a locking projection 47, locking the locking device 4 in the first hole 22. According to an aspect, the flexible element 42 and the locking projection 47 is an integrated part 42, 47.

According to an aspect, the locking pin 41 extends in at least a direction towards the opening 23 and the groove 21 when the locking device 4 is arranged in the first hole 22, as disclosed in FIGS. 2A, 2B, 5, 9A-9C, and 10. According to an aspect, the width of the locking pin 41 is smaller than the width w of the opening 23.

According to an aspect, the locking device 4 comprises an unlocking tab 50, as disclosed in FIGS. 8A-8D and 10. The unlocking tab 50 is configured to be moved in the first direction A away from the groove 21 to move the locking pin 41 from the locking position to the mounting position. According to an aspect, the unlocking tab 50 is connected to the locking pin 41.

According to an aspect, the unlocking tab 50 extends outside the first hole 2 when the locking device 4 is arranged in the first hole 22. According to an aspect, the unlocking tab 50 is arranged flush to an upper opening of the first hole 22 when the locking device 4 is arranged in the first hole 22. A user of the set of panels 1 can reach the unlocking tab 50 and move it in a direction away from the groove 21 and the unlocking tab 50 will move the locking pin 41 from the locking position to the mounting position. The locking pin 41 will in turn move the flexible element 42 and after the force on the unlocking tab 50 is released the flexible element 42 will flex back and move the locking pin 41 back to the locking position. According to an aspect, the unlocking tab 50 is used to camouflage the locking device 4 and the first hole 22 to hide the mounting of the set of panels 1 to each other in a pleasant way.

According to an aspect, the locking device 4 comprises a heel 51 configured to, when the adjacent panel 3 is arranged in the groove 21, interact with the first edge 31 of the adjacent panel 3 and to limit a maximum distance Dmax between the first edge 31 of the adjacent panel 3 and the locking pin 41. As the first edge 31 of the adjacent panel 3 is moved downwards in the groove 21 to the position where the second hole 32 is arranged at the locking pin 41, the first edge 31 should not be moved further downwards. If the first edge 31 is moved further downwards it could arrange the second hole 32 too low in the groove 21 and the locking force between the locking pin 41 and the second hole 32 could be reduced. The heel 51 will make contact with the first edge 31 of the adjacent panel 3 and if the first edge 31 is moved further downwards the locking device 4 will move together with the adjacent panel 3 and the desired position between the second hole 32 and the locking pin 41 is achieved.

According to an aspect, the first hole 22 is a circular hole. A circular segment 25 of the circular shape of the first hole 22 extend into the groove 21 with a height h of the circular segment 25 and a chord c of the circular segment 25 define a width w of the opening 23.

According to an aspect, the second hole 32 is a circular hole, a groove that is parallel to the edge, or a recess.

According to an aspect, the largest diameter (dL) of the locking device 43 is substantially equal to the diameter dH of the first hole 22.

According to an aspect, the cylinder 43 is an eccentric cylinder 43. By eccentric cylinder 43 is meant that the cylinder 43 has different lengths of its axis in different directions. According to an aspect, the eccentric shape of the cylinder is one or a combination of a snail shape, an elliptic shape, an egg shape or a drop shape.

The locking device 4 may, according to an aspect, be made of one or a mix of a metal or a polymer material, such as a thermoplastic material, preferably with a reinforcement, such as glass fibre. The locking device may be produced by injection moulding.

According to an aspect the cylinder 43 is a hollow cylinder 43.

According to an aspect, the largest diameter dL of the locking device 4 is substantially equal to the diameter dH of the first hole 11. Put another way, the largest diameter dL of the locking device 4 is the longest distance along a line between two points on the surface 46.

According to an aspect, the largest diameter dL of the locking device 4 is the longest distance along a line between two points on the surface 46 and including a central point of the cylinder 43. By having the diameter including the largest diameter dL of the locking device 4 being designed to correlate with the diameter of the hole 22, the locking device 4 can be arranged in the first hole 22 and held in position in the hole 22 by friction between the wall 27 of the first hole 22 and the locking device 4.

According to an aspect, the locking device 4 is configured to be moved between the mounting position and the locking position by a user or a machine inserting the adjacent panel 3 in the groove and the first edge 31 and the locking pin 41 interact or that the locking pin 41 is moved by the user, for instance via moving the unlocking tab 50.

In the mounting position the first edge 31 of the adjacent panel 3 is free to be arranged in the groove 21 of the panel 2. The first edge 31 of the adjacent panel 3 is arranged in the groove 21 by moving the adjacent panel 3 toward the panel 2, as shown by the arrow in FIG. 9a, and inserting the first edge 31 into the groove 21.

According to an aspect, the locking pin 41 does not extend through the opening 23 into the groove 21 in the mounting position.

In the locking position the part 41a of the locking pin 41 of the locking device 4 extends into the groove 21 through the opening 23 and lock the adjacent panel 3 in the groove 21, as disclosed in FIG. 5. In the locking position the adjacent panel 3 is locked against the panel 2 and the locking pin 41 is arranged in the second hole 32. According to an aspect, the locking pin 4 is arranged to, in the locking position, lock the adjacent panel 3 to the panel 2 by pressing it against the wall 24 of the groove 21. The part 41a that extends into the groove 21 makes contact with the adjacent panel 3 and presses it against the wall 24 of the groove 21. The part 41a of the locking pin 41 extends through the opening 23 with a length hP, as disclosed in FIG. 5. According to an aspect, the part 41a of the locking pin 41 extends, in the locking position, through the opening 23 into the groove 21 with a length hP that is 5-25% of the largest diameter dL of the cylinder 41. According to an aspect, the part 41a of the locking pin 41 extends, in the locking position, through the opening 23 into the groove 21 with a length hP that is 10-15% of the largest diameter dL of the cylinder 41.

According to an aspect, the radial direction of the cylinder that the part 41a of the locking pin 41 extends into the groove 21 in the locking position substantially corresponds to the height h of the circular segment 25. Put another way, the direction of the height h of the circular segment 25 is the same as the direction of the length hP of the part 41a of the locking pin 41.

According to an aspect, the length of the part 41a of the locking pin 41 that extends into the groove 21 through the opening 23 is configured to gradually increase when the locking device 4 is moved from the mounting position to the locking position. This gives a user of the locking device 4 tactile feedback of that the adjacent panel 3 is tighter and tighter locked in the groove 21.

According to an aspect, the adjacent panel 3 comprises further edges that are configured to be locked against further panels 2.

According to an aspect, the panel 2 comprises two or more holes 22 and a corresponding number of locking devices 4 configured to be arranged in each hole 22. According to an aspect, the panel 2 comprises two or more grooves 21.

According to an aspect, the panel 2 and the adjacent panel 3 is one of a bottom piece of a drawer, a frame, an enforcement panel and a back piece of a furniture product.

According to an aspect, the flexible element 42 is configured to flex a distance in the direction A that is equal to or longer than the length hP of the part 41a of the locking pin 4 that extend into the second hole 32 in the locking position.

Figure 9C:
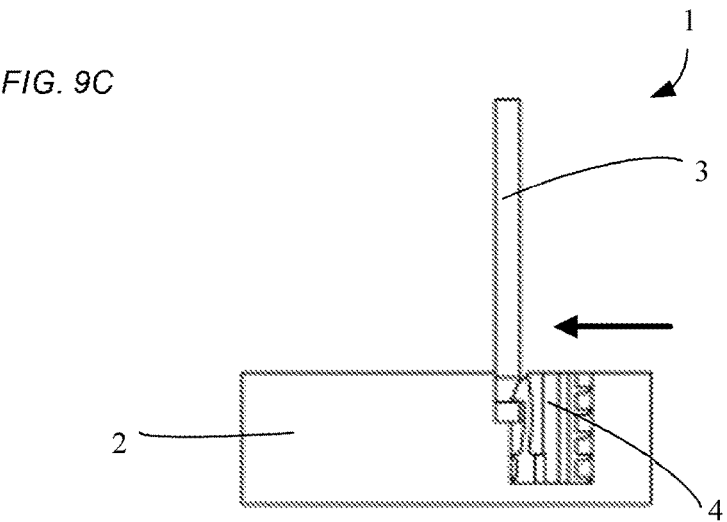
Figure 10:
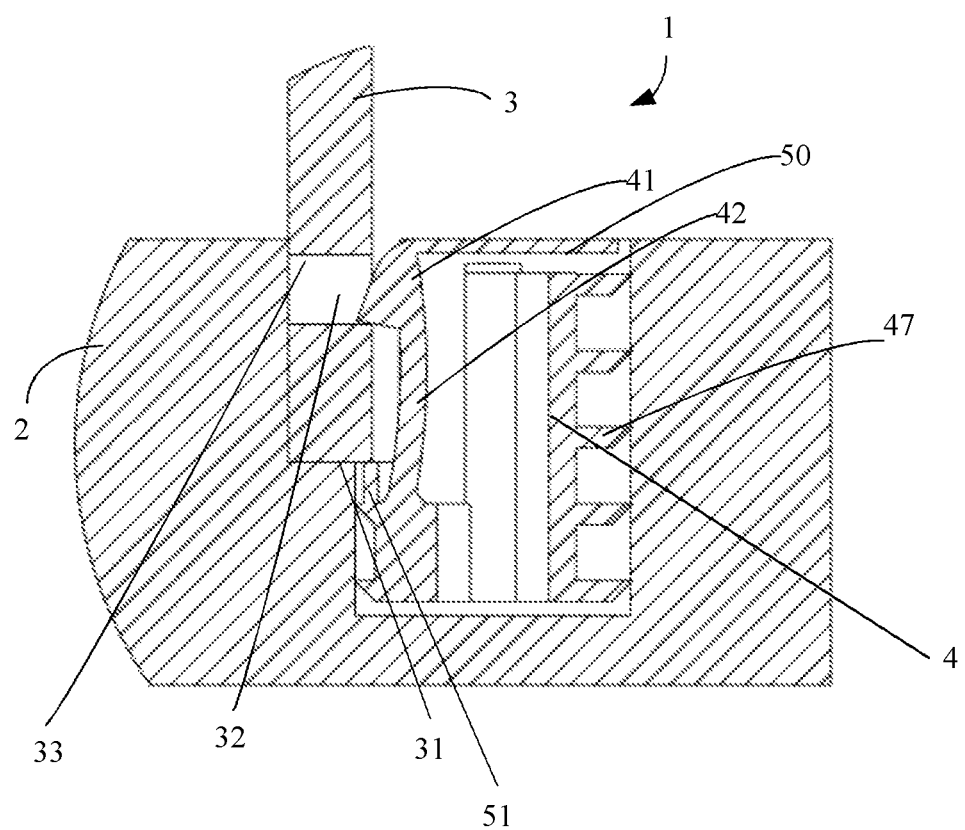
FIG. 10 is a cross sectional view of a part of a set of panels in an assembled state comprising the locking device in FIG. 8a-8d in the locking position.

Hereafter a method for assembly and disassembly of the set of panels 1 according to the above will be described with reference to FIGS. 9A-9C.

When a user should assembly the set of panels 1 the following step is performed. The locking device 4 is inserted into the first hole 22 of the panel 2. The locking pin 41 is moved from the locking position to the mounting position while the first edge 31 of the adjacent panel 3 is inserted into the groove 21 of the panel 2. The locking pin 41 is then moved from the mounting position to the locking position, such that at least a part 41a of the locking pin 41 is arranged in the second hole 32 of the adjacent panel 3. The set of panels 1 is now locked to each other.

According to an aspect, the locking device 4 is inserted into the first hole 22 in a factory by another user or by a machine. Thus the steps of the method could be divided to be performed by different users or by a machine.

After the set of panels 1 are assembled and the user, or another user, would like to disassembly the set of panels 1, the following steps are performed. Moving the locking pin 41 from the locking position to the mounting position unlocks the first edge 31 of the adjacent panel 3 in the groove 21. When the locking pin 41 is moved towards the mounting position the part 41a of the locking pin 41 that was arranged in the second hole 32 is moved out of the second hole 32 and the lock between the panel and the adjacent panel is unlocked.

Thereafter the first edge 31 of the adjacent panel 3 is removed from the groove 21 of the panel (2).

According to an aspect, the above steps are repeated and the set of panels 1 is assembled again. According to an aspect, the panel 2 and/or the adjacent panel 3 is locked to another adjacent panel 3 and/or panel 2.

According to an aspect, the groove 21 of the panel 3 has a width W that is equal to or smaller than the width T of the adjacent panel 3 and the largest diameter dL of the locking device 3 and that is larger than the width T of the adjacent panel 3 and the smallest diameter of the locking device 3. According to an aspect, the edge 31 of the adjacent panel 3 and the locking device 4 is configured to be arranged in the groove 21 and the locking device 4 is moved in the groove 21 between the mounting position and the locking position.

According to an aspect, the set of panels 1 are one of a bottom piece of a drawer, a frame and a back piece of a furniture product.

According to an aspect, the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing. According to an aspect, the decorative layer may comprise a veneer or a paper sheet, such as a melamine-formaldehyde impregnated paper sheet, such as a direct pressure laminate or a high pressure laminate (HPL).

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise panels composing a wood base core, such as HDF, MDF, plywood, particleboard, OSB or masonite.

EMBODIMENTS

1. A set of panels (1), preferably for a furniture product, comprising a panel (2) and an adjacent panel (3), wherein
   the panel (2) comprises a groove (21) and at least a first hole (22) connected to the groove (21) via an opening (23),
   the adjacent panel (3) comprises a first edge (31) that is configured to be arranged in the groove (21) of the panel (2) and a second hole (32) that is configured to be arranged at the opening (23) when the first edge (31) is arranged in the groove (21), and
   the panel (2) comprises a locking device (4) configured to lock the first edge (31) of the adjacent panel (3) in the groove (21) of the panel (2), wherein
   the locking device (4) is configured to be arranged in the first hole (22) of the panel (2),
   the locking device (4) comprises a locking pin (41) and a flexible element (42),
   the flexible element (42) is configured to, when flexed in a first direction (A), move the locking pin (41) from a locking position to a mounting position and to, when flexed back, move the locking pin (41) from the mounting position to the locking position,
   at least a part (41a) of the locking pin (41) is configured to, in the locking position, extend into the groove (21) through the opening (23) of the panel (2) and to be at least partly arranged in the second hole (32) of the adjacent panel (3) when it is arranged in the groove (21), and
   the locking pin (41) is configured to, when moved to the mounting position, be moved in the first direction (A) away from the groove (21), such that the first edge (31) of the adjacent panel (3) is configured to be arranged in the groove (21) of the panel (2).

2. The set of panels (1) according to embodiment 1, wherein the locking device (4) comprises a cylinder (43) comprising a top and bottom base (44, 45) and a surface (46) connecting the top and bottom base (44, 45) and wherein the flexible element (42) and the locking pin (41) is connected to the cylinder (43).

3. The set of panels (1) according to embodiment 1 or 2, wherein in the flexible element (42) is a flexible lever (42) that in a first end (42a) is connected to the cylinder (43) and in a second end (42b) is connected to the locking pin (41).

4. The set of panels (1) according to embodiment 2 or 3, wherein the flexible element (42) is an extension of the surface (46) of the cylinder (43).

5. The set of panels (1) according to any of the preceding embodiments, wherein locking device (4) comprises one or more locking projections (47) configured to lock the locking device (4) against a wall (24) of the first hole (22) of the panel (2) in at least a direction that is parallel with a depth (D22) of the first hole (22).

6. The set of panels (1) according to any of the preceding embodiments, wherein one or more of the flexible elements (42) is configured to lock the locking device (4) against the wall (24) of the first hole (22) of the panel (2) in at least a direction that is parallel with the depth (D22) of the first hole (22).

7. The set of panels (1) according to any of the preceding embodiments, wherein the one or more of the flexible element (42) comprises the locking projection (47).

8. The set of panels (1) according to any of the preceding embodiments, wherein the locking pin (41), when the locking device (4) is arranged in the first hole (22), extend in at least a direction towards the opening (23) and the groove (21).

9. The set of panels (1) according to any of the preceding embodiments, wherein the flexible element (42), when the locking device (4) is arranged in the first hole (22), extend in at least a direction that is parallel the opening (23) and the groove (21).

10. The set of panels (1) according to any of the preceding embodiments, wherein the flexible element (42), when the locking device (4) is arranged in the first hole (22), extends in at least a direction away from the opening (23) and the groove (21).

11. The set of panels (1) according to any of the preceding embodiments, wherein the locking pin (41) comprises a first inclined surface (48) that is configured to interact with a wall

(33) of the second hole (32) of the adjacent panel (3) to lock the adjacent panel (3) in the groove (21).

12. The set of panels (1) according to embodiment 11, wherein the first inclined surface (48) of the locking pin (41) is configured to interact with the wall (33) of the second hole (32) to press the first edge (31) of the adjacent panel (3) downward in the groove (21).

13. The set of panels (1) according to any of the preceding embodiments, wherein the locking pin (41) is configured to interact with the first edge (31) of the adjacent panel (3), when the locking device (4) is arranged in the first hole (31) and the adjacent panel (3) is moved downwards into the groove (21), such that the locking pin (4) is moved from the locking position towards the mounting position.

14. The set of panels (1) according to embodiment 13, wherein the locking pin (4) comprises a second inclined surface (49) configured to interact with the first edge (31) of the adjacent panel (3).

15. The set of panels (1) according to any of the preceding embodiments, wherein the locking device (4) comprises an unlocking tab (50) configured to be moved in the first direction (A) away from the groove (21) to move the locking pin (41) from the locking position to the mounting position.

16. The set of panels (1) according to embodiment 15, wherein the unlocking tab (50) is connected to the locking pin (41).

17. The set of panels (1) according to embodiments 15 or 16, wherein the unlocking tab (50) extends outside the first hole (22) when the locking device (4) is arranged in the first hole (22).

18. The set of panels (1) according to any of the preceding embodiments, wherein the locking device (4) comprises a heel (51) configured to, when the adjacent panel (3) is arranged in the groove (21), interact with the first edge (31) of the adjacent panel (3) and to limit a maximum distance (Dmax) between the first edge (31) of the adjacent panel (3) and the locking pin (41).

19. The set of panels (1) according to any of the preceding embodiments, wherein the first hole (22) is a circular hole, a circular segment (25) of the first hole (22) extend into the groove (21) with a height (h) of the circular segment (25) and a chord (c) of the circular segment (25) define a width (w) of the opening (23).

20. The set of panels (1) according to any of the preceding embodiments, wherein the second hole (32) is a circular hole, a groove that is parallel to the edge or a recess.

21. The set of panels (1) according to any of embodiments 2-20, wherein a largest diameter (dL) of the cylinder (43) is substantially equal to the diameter (dH) of the first hole (22).

22. The set of panels (1) according to any of the preceding embodiments, wherein, in the locking position, the part (41a) of the locking pin (41) extend through the opening (23) into the groove (21) with a length (hP) that is 5-25% of the largest diameter (dL) of the cylinder (43), preferably the length (hP) is 10-15% of the largest diameter (dL) of the cylinder (43).

23. The set of panels (1) according to any of the preceding embodiments, wherein the panel (2) and the adjacent panel (3) is one of a bottom piece of a drawer, a frame and a back piece of a furniture product.

24. A locking device (4) for a furniture product in accordance with any of embodiments 1-23.

25. A method for assembly of a set of panels (1) in accordance to any of embodiments 1-23, comprising the step of:
a) inserting the locking device (4) into the first hole (22) of the panel (2),
b) moving the locking pin (41) from the locking position to the mounting position,
c) inserting the first edge (31) of the adjacent panel (3) into the groove (21) of the panel (2), and
d) moving the locking pin (41) from the mounting position to the locking position, such that at least a part (41a) of the locking pin (41) is arranged in the second hole (32) of the adjacent panel (3).

26. The method according to embodiment 25, the method comprises the further steps of
e) moving the locking pin (41) from the locking position to the mounting position to unlock the first edge (31) of the adjacent panel (3) in the groove (21), and
f) removing the first edge (31) of the adjacent panel (3) from the groove (21) of the panel (2).

The invention claimed is:

1. A set of panels comprising a panel and an adjacent panel, wherein
the panel comprises a groove and at least a first hole connected to the groove via an opening,
the adjacent panel comprises a first edge that is configured to be arranged in the groove of the panel and a second hole that is configured to be arranged at the opening when the first edge is arranged in the groove, and
the panel comprises a locking device configured to lock the first edge of the adjacent panel in the groove of the panel, wherein
the locking device is configured to be arranged in the first hole of the panel,
the locking device comprises a locking pin and a flexible element,
the flexible element is configured to, when flexed in a first direction, move the locking pin from a locking position to a mounting position and to, when flexed away from the first direction, move the locking pin from the mounting position to the locking position,
at least a part of the locking pin is configured to, in the locking position, extend into the groove through the opening of the panel and to be at least partly arranged in the second hole of the adjacent panel when it is arranged in the groove, and
the locking pin is configured to, when moved to the mounting position, be moved in the first direction away from the groove, such that the first edge of the adjacent panel is configured to be arranged in the groove of the panel.

2. The set of panels according to claim 1, wherein the locking device comprises a cylinder comprising a top base, a bottom base, and a surface connecting the top and bottom base, and wherein the flexible element and the locking pin are connected to the cylinder.

3. The set of panels according to claim 1, wherein in the flexible element is a flexible lever that in a first end is connected to a cylinder and in a second end is connected to the locking pin.

4. The set of panels according to claim 2, wherein the flexible element is an extension of the surface of the cylinder.

5. The set of panels according to claim 1, wherein locking device comprises one or more locking projections configured to lock the locking device against a wall of the first hole of the panel in at least a direction that is parallel with a depth of the first hole.

6. The set of panels according to claim 1, wherein one or more flexible elements, which includes the flexible element, is configured to lock the locking device against a wall of the first hole of the panel in at least a direction that is parallel with a depth of the first hole.

7. The set of panels according to claim 6, wherein the one or more of the flexible element comprises a locking projection configured to lock the locking device against the wall of the first hole of the panel in at least the direction that is parallel with the depth of the first hole.

8. The set of panels according to claim 1, wherein the locking pin, when the locking device is arranged in the first hole, extends in at least a direction towards the opening and the groove.

9. The set of panels according to claim 1, wherein the flexible element, when the locking device is arranged in the first hole, extends in at least a direction that is parallel to the opening and the groove.

10. The set of panels according to claim 1, wherein the flexible element, when the locking device is arranged in the first hole, extends in at least a direction away from the opening and the groove.

11. The set of panels according to claim 1, wherein the locking pin comprises a first inclined surface that is configured to interact with a wall of the second hole of the adjacent panel to lock the adjacent panel in the groove.

12. The set of panels according to claim 11, wherein the first inclined surface of the locking pin is configured to interact with the wall of the second hole to press the first edge of the adjacent panel downward in the groove.

13. The set of panels according to claim 1, wherein the locking pin is configured to interact with the first edge of the adjacent panel, when the locking device is arranged in the first hole and the adjacent panel is moved downwards into the groove, such that the locking pin is moved from the locking position towards the mounting position.

14. The set of panels according to claim 13, wherein the locking pin comprises a second inclined surface configured to interact with the first edge of the adjacent panel.

15. The set of panels according to claim 1, wherein the locking device comprises an unlocking tab configured to be moved in the first direction away from the groove to move the locking pin from the locking position to the mounting position.

16. The set of panels according to claim 15, wherein the unlocking tab is connected to the locking pin.

17. The set of panels according to claim 15, wherein the unlocking tab extends outside the first hole when the locking device is arranged in the first hole.

18. The set of panels according to claim 1, wherein the locking device comprises a heel configured to, when the adjacent panel is arranged in the groove, interact with the first edge of the adjacent panel and to limit a maximum distance between the first edge of the adjacent panel and the locking pin.

19. The set of panels according to claim 1, wherein the first hole is a circular hole, a circular segment of the first hole extends into the groove with a height of the circular segment and a chord of the circular segment define a width of the opening.

20. The set of panels according to claim 1, wherein the second hole is a circular hole, a groove that is parallel to the edge or a recess.

21. The set of panels according to claim 2, wherein a largest diameter of the cylinder is substantially equal to the diameter of the first hole.

22. The set of panels according to claim 1, wherein, in the locking position, the part of the locking pin extends through the opening into the groove with a length that is 5-25% of the largest diameter of the cylinder.

23. The set of panels according to claim 1, wherein the panel and the adjacent panel is one of a bottom piece of a drawer, a frame and a back piece of a furniture product.

24. A locking device for a furniture product, the furniture product including a set of panels comprising a panel and an adjacent panel, wherein the panel comprises a groove and at least a first hole connected to the groove via an opening, and the adjacent panel comprises a first edge that is configured to be arranged in the groove of the panel and a second hole that is configured to be arranged at the opening when the first edge is arranged in the groove, wherein:
the locking device is configured to lock the first edge of the adjacent panel in the groove of the panel,
the locking device is configured to be arranged in the first hole of the panel,
the locking device comprises a locking pin and a flexible element,
the flexible element is configured to, when flexed in a first direction, move the locking pin from a locking position to a mounting position and to, when flexed away from the first direction, move the locking pin from the mounting position to the locking position,
at least a part of the locking pin is configured to, in the locking position, extend into the groove through the opening of the panel and to be at least partly arranged in the second hole of the adjacent panel when it is arranged in the groove, and
the locking pin is configured to, when moved to the mounting position, be moved in the first direction away from the groove, such that the first edge of the adjacent panel is configured to be arranged in the groove of the panel.

25. A method for assembly of the set of panels in accordance to claim 1, comprising the steps of:
a) inserting the locking device into the first hole of the panel,
b) moving the locking pin from the locking position to the mounting position,
c) inserting the first edge of the adjacent panel into the groove of the panel, and
d) moving the locking pin from the mounting position to the locking position, such that at least a part of the locking pin is arranged in the second hole of the adjacent panel.

26. A method comprising:
the method for assembly according to claim 25,
e) moving the locking pin from the locking position to the mounting position to unlock the first edge of the adjacent panel in the groove, and
f) removing the first edge of the adjacent panel from the groove of the panel.

27. The locking device according to claim 24, comprising a cylinder which includes a top base, a bottom base, and a surface connecting the top and bottom bases, wherein the flexible element and the locking pin are connected to the cylinder.

* * * * *

UNITED STATES PATENT AND TRADEMARK OFFICE
CERTIFICATE OF CORRECTION

| | |
|---|---|
| PATENT NO. | : 11,272,783 B2 |
| APPLICATION NO. | : 16/220585 |
| DATED | : March 15, 2022 |
| INVENTOR(S) | : Peter Derelöv |

Page 1 of 1

It is certified that error appears in the above-identified patent and that said Letters Patent is hereby corrected as shown below:

In the Claims

Column 15, Lines 3-4, Claim 7:
"the one or more of the flexible element"
Should read:
-- the one or more flexible elements --

Signed and Sealed this
Twenty-third Day of April, 2024

Katherine Kelly Vidal
*Director of the United States Patent and Trademark Office*